United States Patent
Bullock et al.

(10) Patent No.: US 11,232,699 B2
(45) Date of Patent: Jan. 25, 2022

(54) MONITORING ARRANGEMENTS

(71) Applicant: GOJO Industries, Inc., Akron, OH (US)

(72) Inventors: Mark A. Bullock, Wooster, OH (US); David A. Urbanic, Strongsville, OH (US)

(*) Notice: Subject to any disclaimer, the term of this patent is extended or adjusted under 35 U.S.C. 154(b) by 0 days.

(21) Appl. No.: 16/465,306

(22) PCT Filed: Dec. 1, 2017

(86) PCT No.: PCT/US2017/064113
§ 371 (c)(1),
(2) Date: May 30, 2019

(87) PCT Pub. No.: WO2018/102632
PCT Pub. Date: Jun. 7, 2018

(65) Prior Publication Data
US 2019/0392699 A1    Dec. 26, 2019

Related U.S. Application Data

(60) Provisional application No. 62/428,840, filed on Dec. 1, 2016.

(51) Int. Cl.
G08B 21/24      (2006.01)
G06K 9/00       (2006.01)
G08B 21/22      (2006.01)

(52) U.S. Cl.
CPC ...... *G08B 21/245* (2013.01); *G06K 9/00362* (2013.01); *G08B 21/22* (2013.01)

(58) Field of Classification Search
CPC ...... G08B 21/24; G08B 21/245; G08B 21/22; G06K 9/00362
See application file for complete search history.

(56) References Cited

U.S. PATENT DOCUMENTS 5,670,945 A    9/1997  Applonie
6,617,970 B2   9/2003  Makiyama et al.
(Continued)

OTHER PUBLICATIONS

International Search Report from Application No. PCT/US2017/064113 dated Mar. 19, 2018 (17 Pages).

*Primary Examiner* — Brian Wilson
(74) *Attorney, Agent, or Firm* — Calfee, Halter & Griswold LLP (57) ABSTRACT

A system for monitoring at least one person passing through an area includes a first monitor (104), a second monitor (106), and a receiver (108). The first monitor is configured to detect activity in a first zone (110) and to obtain first data relating to detected activity in the first zone. The second monitor is configured to detect activity in a second zone (111) and to obtain second data relating to detected activity in the second zone. In addition, the first monitor is in circuit communication with the second monitor and in wireless communication with the receiver. After obtaining the second data, the second monitor generates a second monitor signal (112) that comprises the second data and sends the second monitor signal to the first monitor. The first monitor is configured to receive the second monitor signal and generate a combined data packet that comprises the first data and the second data. After the first monitor generates the combined data packet, the first monitor sends a combined signal (114) to the receiver, in which the combined signal includes the combined data packet.

19 Claims, 6 Drawing Sheets

(56) References Cited

U.S. PATENT DOCUMENTS

| | | | |
|---|---|---|---|
| 9,619,989 B1* | 4/2017 | Ewing | G08B 21/245 |
| 2002/0000449 A1 | 1/2002 | Armstrong | |
| 2007/0257803 A1* | 11/2007 | Munro | G08B 21/245 |
| | | | 340/573.1 |
| 2009/0309704 A1* | 12/2009 | Chang | H04Q 9/00 |
| | | | 340/10.1 |
| 2012/0299733 A1 | 11/2012 | Knibbe et al. | |
| 2013/0016625 A1* | 1/2013 | Murias | H04Q 9/00 |
| | | | 370/254 |
| 2014/0015964 A1 | 1/2014 | Chew et al. | |
| 2015/0206415 A1 | 7/2015 | Wegelin et al. | |
| 2015/0379860 A1* | 12/2015 | Vardi | G08B 21/0275 |
| | | | 340/8.1 |

* cited by examiner

MONITORING ARRANGEMENTS

RELATED APPLICATIONS

The present application claims the benefits of, and priority to, U.S. Provisional Patent Application Ser. No. 62/428,840, titled MONITORING ARRANGEMENTS, which was filed on Dec. 1, 2016 and is incorporated herein by reference in its entirety.

BACKGROUND

Several situations occur in which it is desirable to know the number of people (or other moving objects) passing through or occupying an area, the time a person passes through an area, or any other type of information for monitoring the movement of one or more people through an area. For example, a hospital administrator may want to know the number of people in a patient's room at a certain time and/or the time a person enters a patient's room. Furthermore, a hospital administrator, for hygiene compliance purposes, may want to know the number of people that entered a room having a hand soap/sanitizer dispenser, such that a comparison can be made between the number of people that entered the room (i.e., number of opportunities for use of the dispenser) and the number of actual uses of the hand soap/sanitizer dispenser. In another example, a building manager may want to know the number of people in a room for compliance with fire codes. In yet another example, an event organizer or entertainment facility administrator may want to know the number of people that entered the facility to watch an event (e.g., a sporting event, a concert, etc.). In these situations, one or more object sensing monitors may be used to detect activity.

SUMMARY

According to an exemplary embodiment of the present application, a system for monitoring at least one person passing through an area includes a first monitor, a second monitor, and a receiver. The first monitor is configured to detect activity in a first zone and to obtain first data relating to detected activity in the first zone. The second monitor is configured to detect activity in a second zone and to obtain second data relating to detected activity in the second zone. In addition, the first monitor is in communication with the second monitor and the receiver. After obtaining the second data, the second monitor generates a second monitor signal that comprises the second data and sends the second monitor signal to the first monitor. The first monitor is configured to receive the second monitor signal and generate a combined data packet that comprises the first data and the second data. After the first monitor generates the combined data packet, the first monitor sends a combined signal to the receiver, in which the combined signal includes the combined data packet.

According to another exemplary embodiment of the present application, a method for counting at least one person passing through an area is contemplated. In the exemplary method, activity is detected within a first zone using a first monitor, and first data related to the activity detected in the first zone is obtained. Activity is detected in a second zone using a second monitor, and second data related to the activity detected in the second zone is obtained. A combined data packet that comprises the first data and the second data is generated, and a combined signal is sent to a receiver, in which the combined signal includes the combined data packet.

According to another exemplary embodiment of the present application, a system includes a first monitoring station, a second monitoring station, and a receiver. The first monitoring station has a first monitor configured to detect activity in a first zone and to obtain first data related to the detected activity in the first zone, and a second monitor configured to detect activity in a second zone and to obtain second data related to the detected activity in the second zone. The second monitoring station has a third monitor configured to detect activity in a third zone and obtain third data related to the detected activity in the third zone, and a fourth monitor configured to detect activity in a fourth zone and to obtain fourth data related to the detected activity in the fourth zone. The receiver is in communication with at least one of the first, second, third, and fourth monitors. The at least one of the first, second, third, and fourth monitors is configured to generate a combined data packet, in which the combined data packet includes at least two of the first data, second data, third data, and fourth data. In addition, the at least one of the first, second, third, and fourth monitors is configured to send to the receiver a combined signal, in which the combined signal includes the combined data packet.

DETAILED DESCRIPTION

The Detailed Description merely describes exemplary embodiments of the invention and is not intended to limit the scope of the claims in any way. Indeed, the invention is broader than and unlimited by the exemplary embodiments, and the terms used in the claims have their full ordinary meaning.

"Circuit communication" indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

"Logic," as used herein, is synonymous with "circuit" or "circuitry" and includes, but is not limited to, hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

"Software," as used herein, includes but is not limited to one or more processor readable and/or executable instructions that cause a processor or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like. The logic of the system may most easily be embodied as part of a software package.

"Signal," includes, but is not limited to one or more electrical signals, analog or digital signals, one or more computer instructions, a bit or bit stream, or the like.

Any values identified in the detailed description are exemplary and they are determined as needed for a particular system. Accordingly, the inventive concepts disclosed and claimed herein are not limited to the particular values or ranges of values used to describe the embodiments disclosed herein.

In people/object monitoring situations, one or more monitors may be used to detect activity, and the monitors may be in circuit communication (e.g., wired or wireless communication) with a receiver. The receiver may, for example, be connected with or associated with a server, a remote central computing system, or the like. In an exemplary embodiment, when the monitors detect activity, the monitors communicate data to the receiver. In an alternative embodiment, the monitors may communicate data to the receiver periodically, rather than each time the monitors detect activity. The data may include, for example, time of detection, monitor identification, amount of detected area in which activity has been detected, location of detected activity, and/or that no activity has been detected.

Installing activity monitors in wired communication with a receiver may be difficult depending on the location of the receiver relative to the monitors. For example, extending wires over a long distance could be costly, impractical, or impossible. In certain circumstances, it may be beneficial to have monitors that wirelessly communicate with the receiver. The wireless communication may be, for example, radio frequency (RF) communication (e.g., radio frequency electromagnetic radiation), infrared (IR) communication, etc. In systems including monitors in wireless communication with a receiver, the monitors send a signal to the receiver that includes data relating to activity detected by the monitors.

An activity monitor is often limited in the amount of space in which the monitor is able to detect activity. In certain situations, a system may be needed that is capable of detecting activity in a large area. In these situations, several monitors may be used to detect activity. For example, if an area is ten feet wide, and each monitor detects activity within a two foot width, the system may include an array of five monitors to cover the ten foot width of the area. Alternatively, an area may be provided with a greater number of activity monitors across its width, such that the monitored zones of each activity monitor overlap. In another embodiment, an area may have a smaller number of activity monitors across its width, such that gaps are disposed between the monitored zones of each activity monitor.

In certain embodiments, each activity monitor in a system may communicate with a receiver, such that each time a monitor detects activity, that monitor communicates the detected activity to the receiver. The monitors may communicate with the receiver by a wired connection or by a wireless connection, by which each monitor sends a monitor signal to the receiver that includes data relating to activity detected by the monitor, including, for example, data relating to the location of the detected object.

Systems that utilize multiple activity monitors in wireless communication with a receiver to detect activity in an area may encounter situations in which multiple people or other moving objects are traveling through the area at the same time. In these situations, the multiple monitors may each detect activity and attempt to send a signal to the receiver at the same time, which may lead to inconsistent receipt of the multiple signals (e.g., the multiple signals jam the system). Inconsistent receipt of signals from the monitors may lead to some detected activity not being received by the receiver.

According to an inventive aspect of the present application, the problem of inconsistent receipt of wireless data signals from multiple activity monitors can be overcome by providing a system that includes multiple monitors that are in communication with each other for generation of a combined data signal that includes data obtained by two or more of the multiple monitors, with the combined signal being sent to the receiver. In other words, instead of having each monitor send an individual signal to the receiver, a combined signal is communicated to the receiver, thereby reducing number of signals being sent to a receiver simultaneously. This reduced signal traffic reduces the chances of an unsuccessful transmission of one or more of multiple individual signals sent to the receiver simultaneously. In an exemplary embodiment, a system includes at least a first monitor (which may be considered a primary monitor) and a second monitor (which may be considered a secondary monitor). Additional secondary monitors (e.g., a third monitor, a fourth monitor, etc.) may also be utilized. The primary monitor receives data from the one or more secondary monitors, and the primary monitor generates a combined data packet that includes data relating to activity detected by the secondary monitors and data relating to activity detected by the primary monitor. Subsequently, the primary monitor communicates the combined data packet in a single, combined data signal to the receiver. The data relating to activity detected by the monitors may include, for example, time of detection, monitor identification, amount of detected area in which activity has been detected, location of the detected activity, and/or that no activity has been detected. The exemplary system described above obviates the problem of jamming the system by multiple signals.

Figure 1:
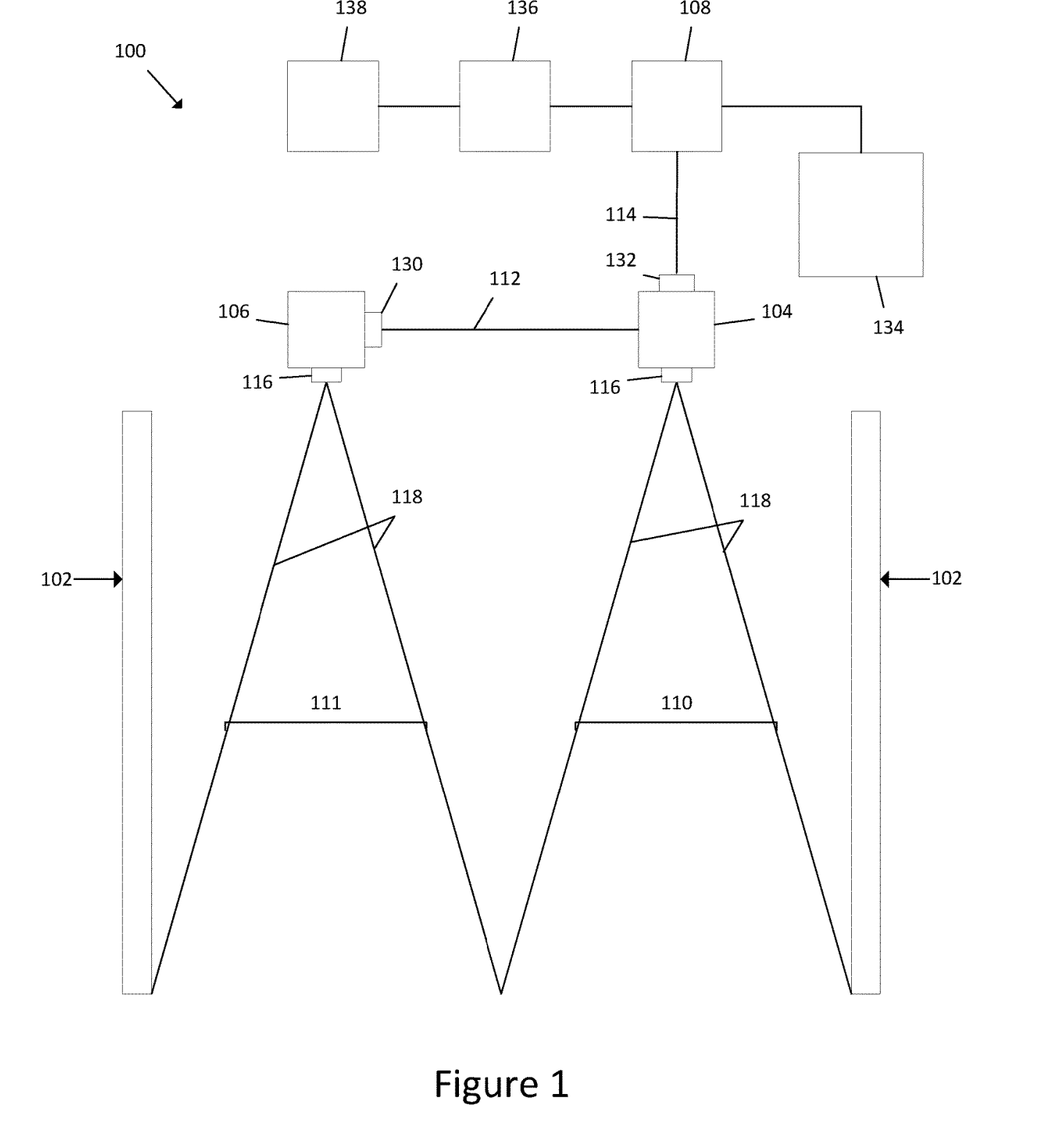
FIG. 1 is a schematic view of an exemplary system for monitoring movement of at least one person through an area.

Referring now to the drawings, FIG. 1 illustrates an exemplary system 100 for monitoring movement of one or more people through an area 102. In certain embodiments, the area 102 may be a restricted passage to a room or enclosure, such as a doorway or gateway. In other embodiments, the area 102 may be a less restrictive zone of egress, such as, for example, a hallway, courtyard, lobby, or the like. In the illustrated embodiment, the system 100 includes a first monitor 104, a second monitor 106, and a receiver 108. The first monitor 104 is configured to detect activity in a first zone 110, and the second monitor 106 is configured to detect activity in a second zone 111. In various embodiments, the monitors 104, 106 may each include one or more suitable sensors 116 operable to detect activity (e.g., presence, movement, heat signature, etc.) in the monitored zones 110, 111. In the illustrated embodiment, the sensor 116 emits a signal 118 (e.g., light signal, IR signal, ultrasonic signal) and, if the signal 118 is blocked, reflected, or otherwise disturbed or changed (e.g., by a person being in the area covered by the sensor 116), the corresponding monitor 104, 106 generates a data signal indicating that an object is occupying the area 102. The sensor 116 may take many forms, such as, for example, active sensors, passive sensors, infrared sensors, parallel sensors, triangulated sensors, position sensitive devices, time of flight distance sensors, radio frequency signal strength sensors, capacitive sensors, inductive sensors, microwave sensors, optical sensors, sonar sensors, ultrasonic sensors, laser sensors, temperature detection sensors, or the like. A monitor may detect activity in various ways, such as, for example, disturbance of a signal emitted from a sensor, change in IR signal received, etc.

The first monitor 104 and the second monitor 106 are in circuit communication with each other. The monitors may communicate by a wireless connection or by a wired connection. The wireless communication may be, for example, radio-frequency communication, infrared (IR) communication, etc. In the illustrated embodiment, the second monitor 106 includes a transmitter 130 that is configured to transmit a signal 112 by wired or wireless communication to the first monitor 104, and the first monitor 104 includes a transmitter 132 that is configured to transmit a signal 114 to the receiver 108. In an exemplary embodiment, when the second monitor 106 detects activity, the second monitor 106 transmits a second monitor signal 112 to the first monitor 104 that includes data relating to activity detected by the second monitor 106. The first monitor 104 receives the signal 112 from the second monitor 106, and the first monitor 104 generates a combined data packet that includes data relating to activity detected by the second monitor 106 and the data relating to activity detected by the first monitor 104. Subsequently, the first monitor 104 transmits a combined signal 114 to the receiver 108 that includes the combined data packet. The data relating to activity detected by the monitors 104, 106 may include, for example, time of detection, identification, amount of detected area in which activity has been detected, location of detected activity, rate of movement of the detected object, and/or that no activity has been detected. In certain embodiments, the system 100 includes additional monitors (i.e., multiple "secondary" monitors) in circuit communication with the first monitor 104. In these embodiments, when at least one of the secondary monitors 106 detects activity, the subsequent signal 114 from the first monitor 104 to the receiver 108 contains a combined data packet (generated by the first monitor 104) that includes data from one or more of the secondary monitors 106 and the first monitor 104. In various embodiments, the receiver 108 includes a processor 134 that is operable (e.g., using software) to analyze the data that is received by the receiver 108. The processor 134 is configured to manipulate the data in order to determine, evaluate, and/or report information about activity in the area, including, for example, the number of people that have passed through the area.

Figure 2:
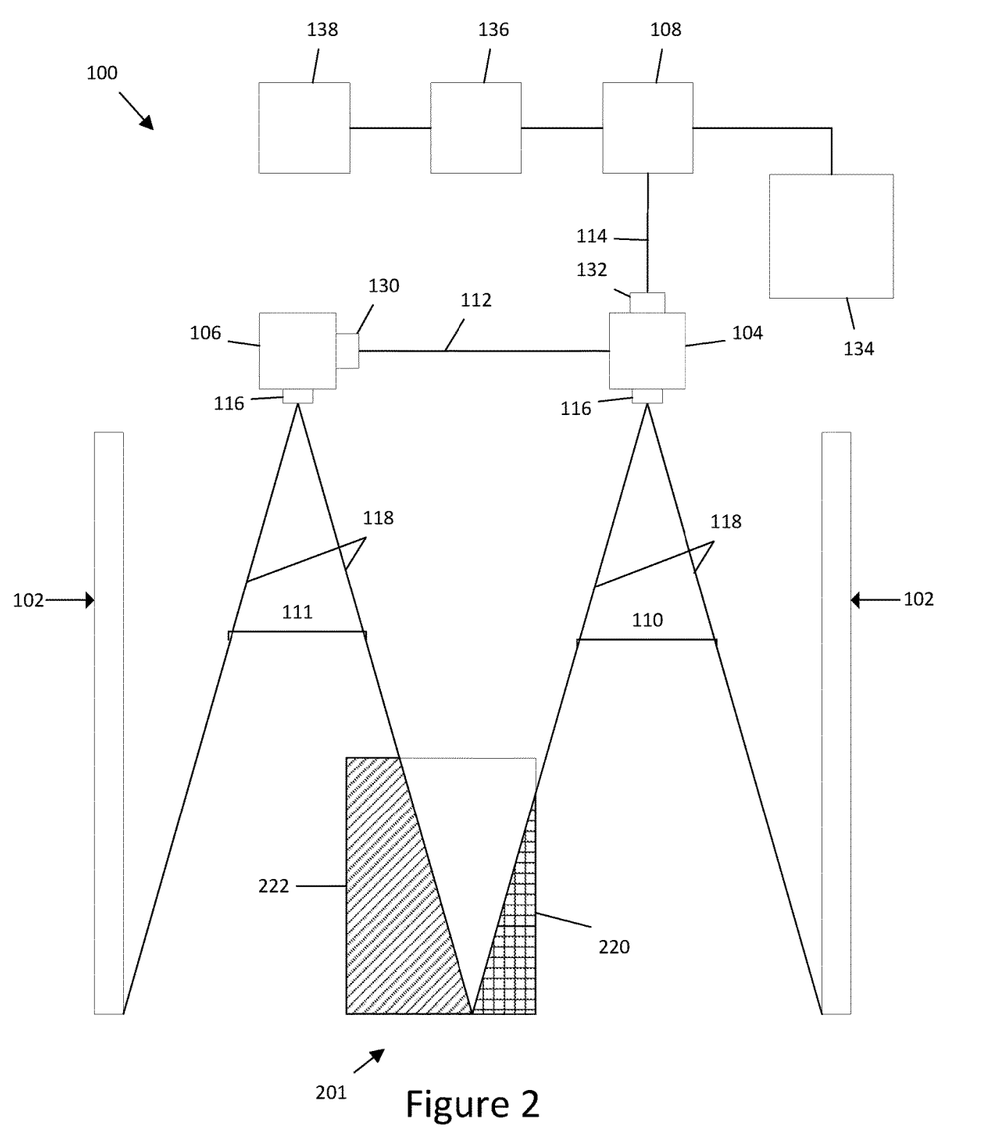
FIG. 2 is a schematic view of the system of FIG. 1 with an object being detected by the system.

Referring to FIG. 2, portions of an object 201 (e.g., a person) may be detected by both the first monitor 104 and the second monitor 106. In the illustrated embodiment, a first portion 220 of the object 201 is detected by the first monitor 104, which obtains first data related to the first portion 220 of the object, and a second portion 222 of the object 201 is detected by the second monitor 106, which obtains second data related to the second portion 222 of the object 201. After the activity is detected, the second monitor 106 sends a second monitor signal 112 to the first monitor 104 that includes the second data. Subsequently, the first monitor 104 generates a combined data packet that includes the first and second data, and the primary monitor 104 sends a combined signal 114 containing the combined data packet to the receiver 108. In this embodiment, the receiver 108 communicates with a processor 134 operable (e.g., using software) to manipulate the received data in order to evaluate the objects 201 that were detected by the system 100. In the illustrated embodiment, although both the first monitor 104 and the second monitor 106 detected portions of the object 201, the processor may evaluate the combined data to conclude that only a single object 201 passed through the area 102, based on the size and/or the location of the detected portions 220, 222.

The system 100 may be used in combination with other monitoring devices. As one example, the system 100 may be used in combination with a device usage monitor 136 to compare the number of people that pass through an area to the number of people that use a device (e.g., a soap/sanitizer dispenser) within that area. For example, a hospital administrator, restaurant owner, or food services manager may want to know the number of employees that use a hand soap/sanitizer dispenser in a certain location. Referring to FIGS. 1 and 2, a soap/sanitizer dispenser 138 may be in circuit communication with a device usage monitor 136 that is in circuit communication with the receiver 108. In certain embodiments, the device usage monitor 136 is integral to the dispenser 138. The device usage monitor 136 is configured to monitor data of the dispenser 138 (e.g., the number of actuations of the dispenser) and send the data of the dispenser to the receiver. In addition, the receiver 108 may be in circuit communication with a processor 134 operable to analyze the data obtained by the system 100 and the data of the dispenser 138 obtained by the device usage monitor 136. The processor 134 may be configured to evaluate the data obtained by the system 100 and the data of the dispenser 138 in order to compare the obtained data. For example, the processor 134 may be configured to compare the opportunities for using the dispenser with the actual uses of the dispenser. That is, the processor 134 can compare the number of people that entered a room (as determined by the system 100) to the number of actuations of the dispenser 138 (as determined by the device usage monitor 136).

Figure 3:
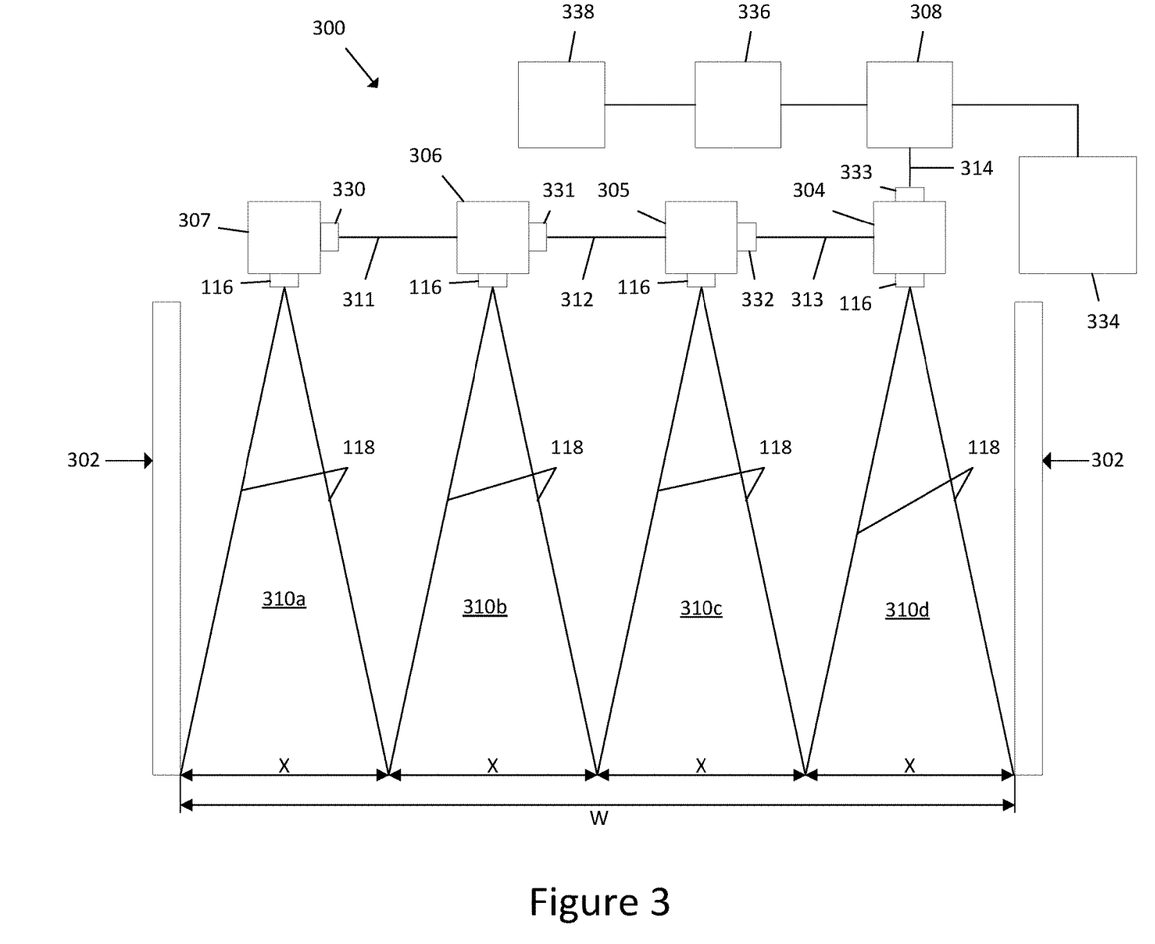
FIG. 3 is a schematic view of another exemplary system for monitoring movement of at least one person through an area.
Figure 4:
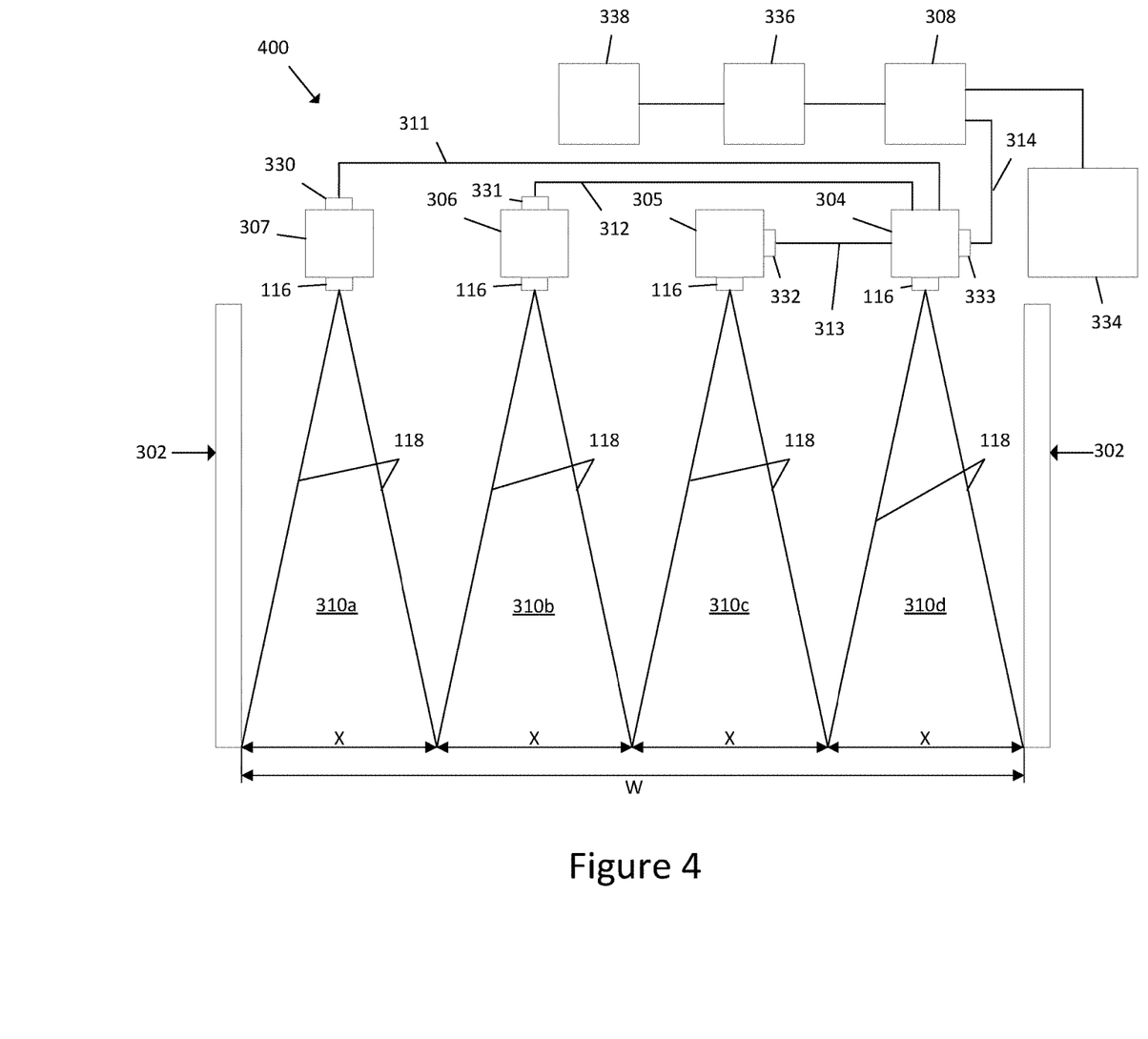
FIG. 4 is a schematic view of another exemplary system for monitoring movement of at least one person through an area.

Referring to FIGS. 3 and 4, the systems 300, 400 may include multiple secondary monitors (305, 306, 307) that are in circuit communication with a primary or first monitor 304. The number of secondary monitors (305, 306, 307) is dependent upon the width W of the area 302. Each monitor (304, 305, 306, 307) is configured to detect activity in a zone 310a-d. In certain embodiments, each zone 310a-d has a width X. Therefore, for example, if the width W of the area 302 is twelve feet, and the width X of each zone 310a-d is three feet, then four monitors (304, 305, 306, 307) may be used to cover the width W of the area 302. In an alternative embodiment, the zones 310a-d may be configured to overlap (not shown), such that more monitors may be used to cover the width W of the area 302. In another alternative embodiment, the zones 310a-d may be configured with gaps (not shown) located between the zones 310a-d, such that fewer monitors may be used to cover the width W of the area 302. In certain embodiments, the width X of each zone 310a-d may be different, with a suitable number of monitors being used to adequately monitor the entire area 302. Communication between the monitors (304, 305, 306, 307) and/or the receiver 308 may be by a hardwire connection or by a wireless connection. The wireless communication may be, for example, radio frequency (RF) communication (e.g., radio frequency electromagnetic radiation), infrared (IR) communication, etc. As shown in the illustrated embodiment, the monitors (304, 305, 306, 307) may include transmitters (330, 331, 332, 333) that are configured to communicate with the monitors (304, 305, 306, 307) and/or the receiver 308. The receiver 308 may take any suitable form, such as, for example, any form described in the present application.

Referring to FIG. 3, the system 300 may include a daisy chain wiring scheme. For example, the first, second, third and fourth monitors (304, 305, 306, 307) may communicate with each other in sequence. The monitors (304, 305, 306, 307) communicate in a direction from the fourth monitor 307 to the first monitor 304. In one example, periodically or upon detection of activity, the fourth monitor 307 sends a fourth monitor signal 311 to the third monitor 306, and the third monitor 306 generates a first data packet that includes data relating to activity detected by the fourth monitor 307 and the third monitor 306. Then, the third monitor 306 sends a third monitor signal 312 to the second monitor, and the second monitor 305 generates a second data packet that includes data of the first data packet and data relating to activity detected by the second monitor 305. Next, the second monitor 305 sends a second monitor signal 313 to the first monitor 304, and the first monitor generates a combined data packet that includes data of the second data packet and data relating to activity detected by the first monitor 304. Subsequently, the first monitor 304 sends a combined or first monitor signal 314 to the receiver 308 that includes the combined data packet. In yet another example, if the second monitor 305 detects activity without corresponding detection by the third and fourth monitors, the second monitor sends a second monitor signal 313 to the first monitor 304, and the first monitor generates a combined data packet that includes data relating to activity detected by the second monitor 305 and the first monitor 304. Subsequently, the first monitor 304 sends a combined signal 314 to the receiver 308 that includes the combined data packet. In another example, if the first monitor 304 detects activity without corresponding detection by the second, third and fourth monitors, the first monitor sends a signal 314 to the receiver that includes data relating to activity detected by only the first monitor 304.

In an alternative embodiment, the system 300 may be configured such that each time a monitor (304, 305, 306, 307) detects activity, the primary monitor 304 interrogates each of the secondary monitors to obtain data from each of the secondary monitors (305, 306, 307) by the way of the daisy chain wiring scheme described above, and the signal 314 from the primary monitor 304 to the receiver 308 contains a combined data packet that includes data relating to activity detected by all of the monitors (304, 305, 306, 307). In another alternative embodiment, in which the daisy chain wiring scheme is used, the primary monitor 304 periodically communicates a combined data packet to the receiver 308 that includes data relating to activity detected by the monitors (304, 305, 306, 307) during a specified period of time or at a predetermined time interval, rather than sending a signal 314 each time activity is detected by a monitor (304, 305, 306, 307). In this alternative embodiment, the combined data packet may include data relating to multiple detections of activity by the monitors (304, 305, 306, 307). Data relating to activity detected by the monitors (304, 305, 306, 307) may include, for example, time of detection, monitor identification, amount of detected area in which activity has been detected, location of detected activity, and/or that no activity has been detected. In various embodiments, the receiver 308 includes a processor 334 that is operable (e.g., using software) to analyze the data that is received by the receiver 308. The processor 334 is configured to manipulate the data in order to determine the number of people that have passed through the area.

Referring to FIG. 4, the system 400 may include a hub and spokes wiring scheme. For example, each of the secondary monitors (305, 306, 307) may communicate directly with the first monitor 304. The illustrated embodiment includes first, second, third, and fourth monitors 304, 305, 306, 307, and a receiver 308. When the fourth monitor 307 detects activity, the fourth monitor 307 sends a fourth monitor signal 311 to the first monitor 304 that includes data relating to activity detected by the fourth monitor 307. The first monitor 304 receives the fourth monitor signal 311 and generates a combined data packet that includes at least the data relating to activity detected by the fourth monitor 307 and the first monitor 304. Subsequently, the first monitor 304 sends a combined signal 314 to the receiver 308 that includes the combined data packet. Similarly, when the third monitor 306 detects activity, the third monitor 306 sends a third monitor signal 312 to the first monitor 304 that includes data relating to activity detected by the third monitor 306. The first monitor 304 receives the third monitor signal 312 and generates a combined data packet that includes at least the data relating to activity detected by the third monitor 306 and the first monitor 304. Subsequently, the first monitor 304 sends a combined signal 314 to the receiver 308 that includes the combined data packet. Likewise, when the second monitor 305 detects activity, the second monitor 305 sends a second monitor signal 313 to the first monitor 304 that includes data relating to activity detected by the second monitor 305. The first monitor 304 receives the second monitor signal 313 and generates a combined data packet that includes at least the data relating to activity detected by the second monitor 305 and the first monitor 304. Subsequently, the first monitor 304 sends a combined signal 314 to the receiver 308 that includes the combined data packet. Optionally, when the first monitor concurrently receives two or more of the second, third, and fourth monitor signals, the first monitor may generate a combined data packet that includes data relating to activity detected by the corresponding two or more monitors. In addition, when the first monitor 304 detects activity, the first monitor may send a signal 314 to the receiver 308 that includes only data from the first monitor 304.

In an alternative embodiment, the system 400 may be configured such that each time that any monitor (304, 305, 306, 307) detects activity, the first monitor 304 interrogates each of the secondary monitors to obtain data from each of the secondary monitors (305, 306, 307) and send a combined signal 314 to the receiver 308 containing a combined data packet that includes data relating to activity detected by each of the monitors (304, 305, 306, 307). In another alternative embodiment, the primary monitor 304 periodically (i.e., at a predetermined time interval) interrogates each of the second monitors to obtain data from each of the secondary monitors (305, 306, 307) and send a combined signal 314 to the receiver 308 containing a combined data packet that includes data relating activity detected by the monitors (304, 305, 306, 307) during a specified period of time. In this alternative embodiment, the combined data packet may include data relating to multiple detections of activity by the monitors (304, 305, 306, 307). Data relating to activity detected by the monitors (304, 305, 306, 307) may include, for example, time of detection, monitor identification, amount of detected area in which activity has been detected, location of detected activity, and/or that no activity has been detected. In various embodiments, the receiver 308 includes a processor 334 that is operable (e.g., using software) to analyze the data that is received by the receiver 308. The processor 334 is configured to manipulate the data in order to determine information about activity in the area (e.g., the number of people that have passed through the area).

Referring to FIGS. 3 and 4, the systems 300, 400 may be used in combination with other monitoring devices. As one example, the systems 300, 400 may be used in combination with a device usage monitor 336 to compare the number of people that pass through an area to the number of people that use a device (e.g., a soap/sanitizer dispenser) within that area. For example, a hospital administrator, restaurant owner, or food services manager may want to know the number of employees that use a hand soap/sanitizer dispenser in a certain location. Referring to FIGS. 3 and 4, a soap/sanitizer dispenser 338 may be in circuit communication with a device usage monitor 336 that is in circuit communication with the receiver 308. In certain embodiments, the device usage monitor 336 is integral to the dispenser 338. The device usage monitor 336 is configured to monitor data of the dispenser 338 (e.g., the number of actuations of the dispenser) and send the data of the dispenser to the receiver. In addition, the receiver 308 may be in circuit communication with a processor 334 operable to analyze the data obtained by the systems 300, 400 and the data of the dispenser 338 obtained by the device usage monitor 336. The processor 334 may be configured to evaluate the data obtained by the system 300 and the data of the dispenser 338 in order to compare the obtained data. For example, the processor 334 may be configured to compare the opportunities for using the dispenser with the actual uses of the dispenser. That is, the processor 334 can compare the number of people that entered a room (as determined by the systems 300, 400) to the number of actuations of the dispenser 338 (as determined by the device usage monitor 336).

Figure 5:
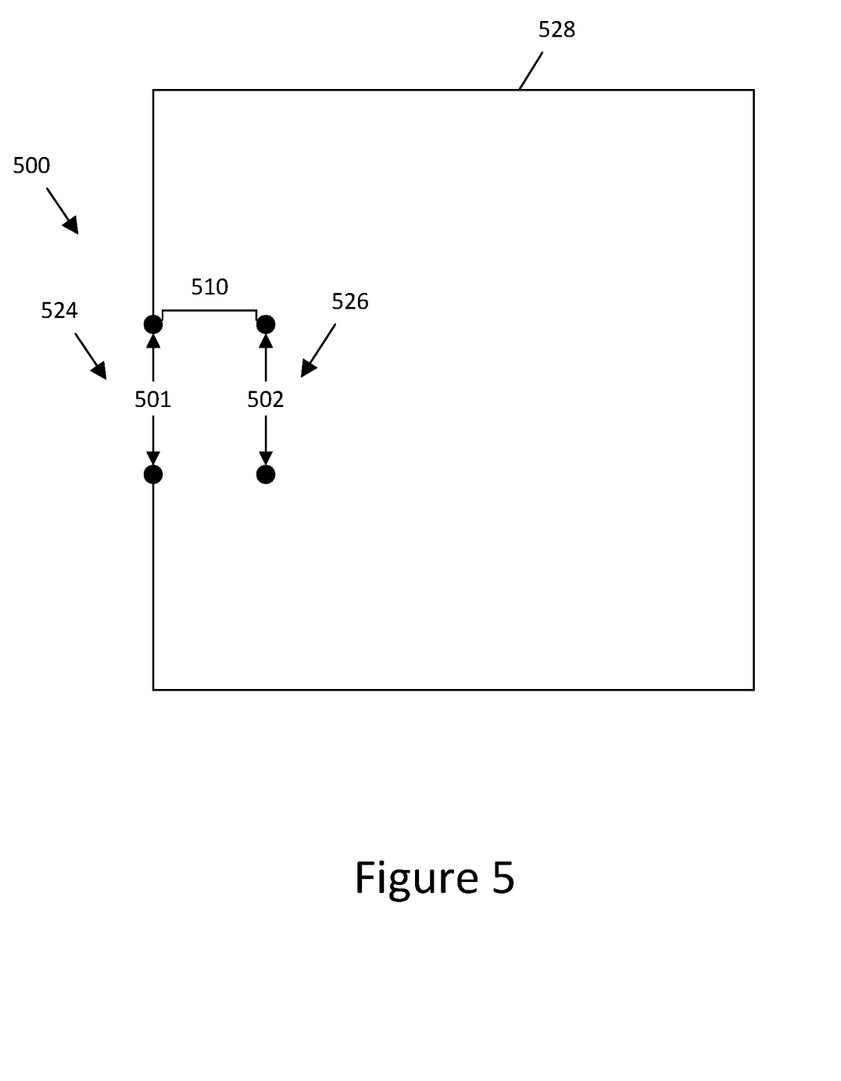
FIG. 5 is a schematic view of an exemplary system having multiple monitoring stations monitoring movement of at least one person through an area.

Systems for monitoring movement of one or more people through an area may provide unreliable results if monitors detect activity from people that step into the area but do not pass through the area. For example, a person may stand in a doorway of a room to talk to someone in the room, but that person may not actually enter the room. Referring to FIG. 5, a system 500 is illustrated that is configured to prevent falsely identifying a person at the entrance of an area 510 as having passed through the area 510. In the illustrated embodiment, the system 500 includes a first monitoring station 524 and a second monitoring station 526. In alternative embodiments, the system 500 may include three or more monitoring stations. The monitoring station 524, 526 may take the form of the systems (100, 300, 400) described in FIGS. 1-4. The first monitoring station 524 detects activity at a first portion 501 of an extended area 510, and the second monitoring station 526 detects activity at a second portion 502 of the extended area 510. In this embodiment, a person is determined to occupy a room 528 (or pass through an area 510) if that person is detected by the first monitoring station 524 in the first portion 501 of the area 510 and then by the second monitoring station 526 in the second portion 502 of the area 510. In addition, a person is determined to exit or cease occupying a room 528 (or pass through an area 510 in the opposite direction) if that person is detected by the second monitoring station 526 in the second portion 502 of the area 510 and then by the first monitoring station 524 in the first portion 501 of the area 510. In certain embodiments, each monitoring station 524, 526 includes a first or primary monitor (104, 304) configured to communicate with a receiver (108, 308), and one or more secondary monitors (106, 305, 306, 307) in circuit communication with the primary monitor (104, 304). In an alternate embodiments, only one monitoring station 524, 526 has a primary monitor (104, 304) configured to communicate with a receiver (108, 308), with the remaining monitors of the monitoring stations 524, 526 being secondary monitors (106, 305, 306, 307). In this alternative embodiment, the secondary monitors (106, 305, 306, 307) of each monitoring station 524, 526 are in circuit communication with the one primary monitor (104, 304), and the one primary monitor (104, 304) is configured to transmit a combined signal including a combined data packet that includes data of one or more of the secondary monitors (10, 305, 306, 307) and the primary monitor (104, 304) to the receiver (108, 308). In various embodiments, the receiver (108, 308) may communicate with a processor (134, 334) operable (e.g., using software) to manipulate data that is received from the monitoring stations 524, 526. For example, the processor may be configured to determine whether a person enters or exits a room 528 (or area 510) depending upon the order in which the person passes the monitoring stations 524, 526.

In various situations, a location in which activity is being monitored may have multiple areas (e.g., a room having multiple entrances/exits) being monitored for activity. Each area may include any system (100, 300, 400, 500) described in FIGS. 1-5, or any combination of those systems (100, 300, 400, 500). For example, each area may include a primary monitor (104, 304) and one or more secondary monitors (106, 305, 306, 307), and the primary monitor in each area may transmit a combined signal (114, 314) to a receiver 308, in which the signal (114, 314) contains a combined data packet that includes data relating to activity detected by one or more of the monitors (104, 304, 106, 305, 306, 307) in that area. In an alternative embodiment, some areas may include only secondary monitors (106, 305, 306, 307), and these secondary monitors (106, 305, 306, 307) are in circuit communication with a primary monitor (104, 304) disposed in a different area. In this alternative embodiment, the primary monitor (104, 304) receives data relating to activity detected by the secondary monitors (106, 305, 306, 307) disposed in the same area and the secondary monitors (106, 305, 306, 307) disposed in different areas. Subsequently, the primary monitor (104, 304) sends a combined signal (114, 314) containing a combined data packet that includes data relating to activity detected by the secondary monitors in the same area as the primary monitor (104, 304), activity detected by the secondary monitors in different areas than the primary monitor (104, 304), and activity detected by the primary monitor (104, 304). In various embodiments, the receiver (108, 308) includes a processor (134, 334) operable (e.g., using software) to analyze the combined data packet that is received by the receiver (108, 308). The processor (134, 334) is configured to manipulate the data in order to determine information about activity in the area (e.g., the number of people that have passed through the area).

Figure 6:
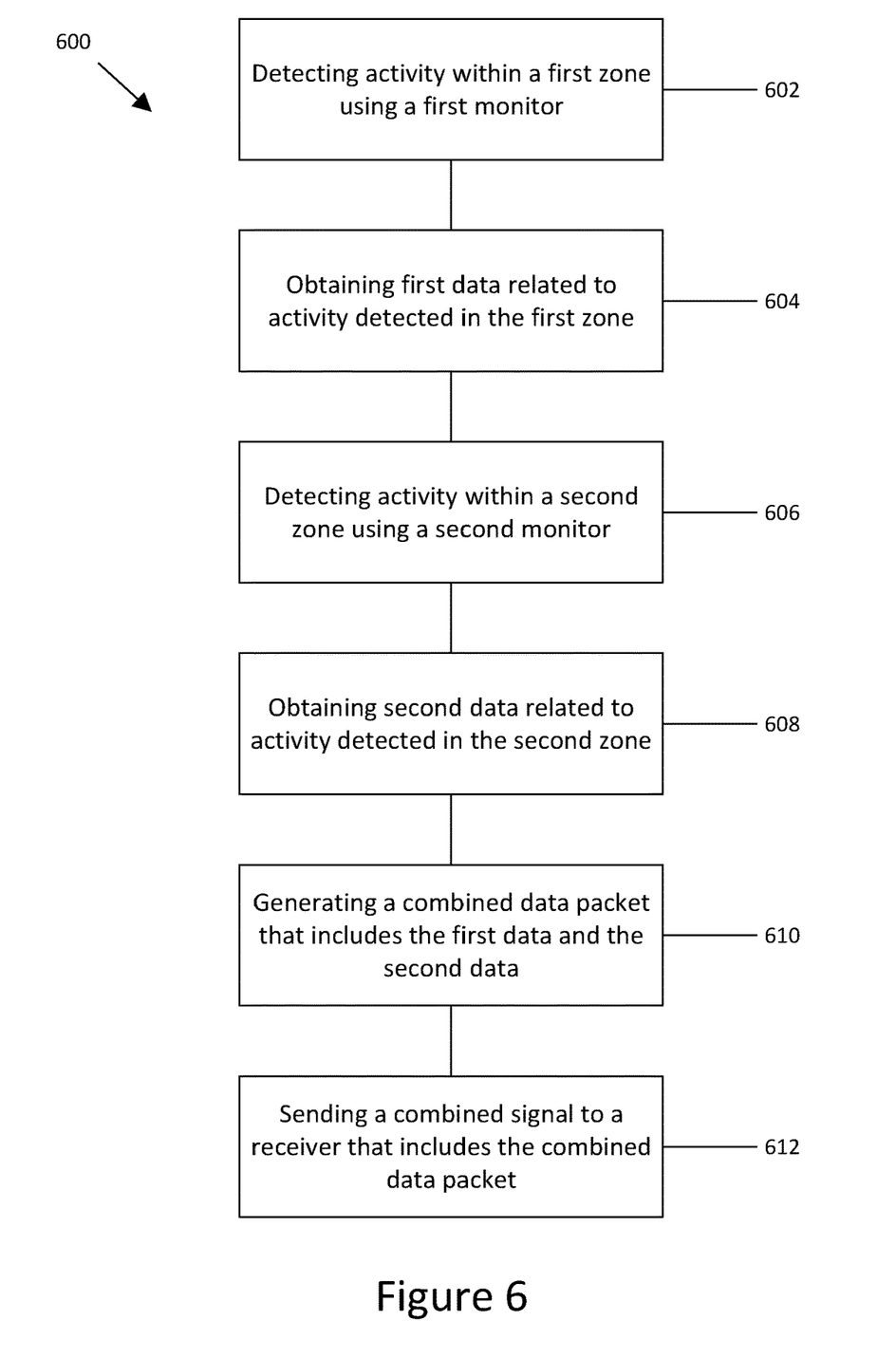
FIG. 6 is a flowchart of an exemplary method for monitoring movement of at least one person through an area.

Referring to FIG. 6, a method 600 of monitoring movement of at least one person through an area is shown. Activity is detected in a first zone using a first monitor (shown at block 602) and first data related to activity detected in the first zone is obtained (block 604). Activity in a second zone is detected using a second monitor (block 606) and second data related to activity detected in the second zone is obtained (block 608). The first and second monitors may take any suitable form, such as, for example, the form of any monitor described in the present application. A combined data packet is generated to include the first data and the second data (block 610) and a combined signal including the combined data packet is sent to a receiver (block 612). The receiver may take any suitable form, such as, for example, the form of any receiver described in the present application. In an exemplary embodiment, the second monitor generates a second monitor signal that includes the obtained data related to activity detected in the second zone and sends the second signal to the first monitor, and the first monitor is configured to receive the second monitor signal, to generate the combined data packet, and to send the combined signal containing the combined data packet to the receiver. In certain embodiments, a method includes detecting activity within a third zone using a third monitor and obtaining third data related to activity detected in the third zone. In these embodiments, the generated data packet may also include the obtained data related to activity detected in the third zone. In various embodiments, the method 600 includes analyzing the combined data packet to determine information about activity in the area (e.g., a number of people that passed through the area). The combined data packet may be analyzed by a processor (134, 334) operable (e.g., using software) to manipulate the data.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions-such as alternative materials, structures, configurations, methods, circuits, devices and components, software, hardware, control logic, alternatives as to form, fit and function, and so on-may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A system for monitoring at least one person passing through an area, the system comprising:
    a plurality of zones arranged in an array across an entry point to the area, such that one or more people entering the area must pass through at least one of the plurality of zones;
    wherein there are no gaps in the plurality of zones across the entry point to the area wherein a person would not be detected when entering the area;
    a primary monitor configured to detect activity caused by movement of one or more people through a first zone of the area using an active sensor and to obtain first data relating to detected activity in the first zone;
    a first secondary monitor configured to detect activity caused by movement of one or more people through a second zone of the area using an active sensor and to obtain second data relating to detected activity in the second zone, wherein the first secondary monitor is in circuit communication with the primary monitor; and
    a receiver in communication with the only the primary monitor;
        wherein, after obtaining the second data, the first secondary monitor generates a second monitor signal that comprises the second data and sends the second monitor signal to the primary monitor;
    wherein the first secondary monitor has a single communication path to the primary monitor and wherein all communications from the first secondary monitor flow to the primary monitor;
    wherein the first secondary monitor does not communicate with the receiver;
    wherein the primary monitor is configured to receive the second monitor signal and generate a combined data packet that comprises the first data and the second data;
    wherein, after the primary monitor generates the combined data packet, the primary monitor sends a combined signal to the receiver, the combined signal including the combined data packet.

2. The system of claim 1, further comprising a processor in circuit communication with the receiver, wherein the processor analyzes the combined data packet to determine if at least one person passes through the area.

3. The system of claim 2, further comprising a dispenser and a device usage monitor, wherein the dispenser is in circuit communication with the device usage monitor, wherein the device usage monitor is in circuit communication with the receiver, and wherein the device usage monitor is configured to monitor data of the dispenser and send the data of the dispenser to the receiver.

4. The system of claim 3, wherein the processor is configured to analyze the data of the dispenser within data of the combined data packet.

5. The system of claim 1, further comprising a second secondary monitor configured to detect activity in a third zone of the area and to obtain third data relating to detected activity in the third zone of the area, wherein the second secondary monitor has a single communication path to the primary monitor to transmit a second secondary monitor signal comprising the third data.

6. The system of claim 5, wherein, after obtaining the third data, the second secondary monitor transmits the second secondary monitor signal to the first secondary monitor.

7. The system of claim 6, wherein the second monitor signal generated by the first secondary monitor further comprises the third data, and wherein the combined data packet generated by the primary monitor further comprises the third data.

8. The system of claim 5, wherein the second secondary monitor transmits the second secondary monitor signal to the primary monitor.

9. The system of claim 8, wherein the combined data packet further comprises the third data.

10. The system of claim 8, wherein the second secondary monitor transmits the second secondary monitor signal directly to the primary monitor.

11. The system of claim 1, wherein the primary monitor wirelessly communicates with the receiver.

12. The system of claim 1, wherein the first secondary monitor wirelessly communicates with the primary monitor.

13. The system of claim 1 wherein the combined signal includes overlapping detection of the activity where at least the primary monitor and the first secondary monitor detected a portion of a person or the first secondary monitor and a second secondary monitor both detected a portion of the same person.

14. A method for counting at least one person passing through an area, the method comprising:
  a plurality of zones arranged in an array across an entry point to the area, such that one or more people entering the area must pass through at least one of the plurality of zones;
  wherein there are no gaps in the plurality of zones across the entry point to the area wherein a person would not be detected when entering the area;
  detecting activity caused by movement of one or more people through a first zone of the area using a primary monitor that has an active sensor;
  obtaining first data related to activity detected in the first zone;
  detecting activity caused by movement of one or more people through a second zone of the area using a first secondary monitor that has an active sensor;
  wherein the first secondary monitor has a single communication path to the primary monitor;
  obtaining second data related to activity detected in the second zone;
  sending the second data from the first secondary monitor to the primary monitor through the single communication path;
  generating a combined data packet at the primary monitor that comprises the first data and the second data; and
  sending a combined signal from the primary monitor to a receiver, the combined signal including the combined data packet; and
  wherein the first secondary monitor does not communicate with the receiver.

15. The method of claim 14, further comprising:
  detecting activity within a third zone using a second secondary monitor;
  wherein the second secondary monitor has a single communication path to the primary monitor;
  obtaining third data related to activity detected in the third zone;
  sending the third data to the primary monitor through the single communication path between the second secondary monitor and the primary monitor;
  wherein the combined data packet further comprises the third data.

16. The method of claim 15, wherein the primary monitor is in wired communication with the first secondary monitor and in wireless communication with the receiver.

17. The method of claim 14, further comprising analyzing the combined data packet to determine a number of people that passed through the area.

18. The method of claim 14, wherein the combined signal is sent to the receiver by a wireless communication.

19. The method of claim 14 wherein the combined signal includes activity detected by the primary monitor and activity detected by the first secondary monitor or activity detected by the first secondary monitor and a second secondary monitor, wherein both activities were caused by a single person occupying a portion of the first zone and the second zone simultaneously.

* * * * *